No. 835,038. PATENTED NOV. 6, 1906.
F. W. SIMPSON.
HAY SLING OR NET.
APPLICATION FILED MAY 10, 1906.
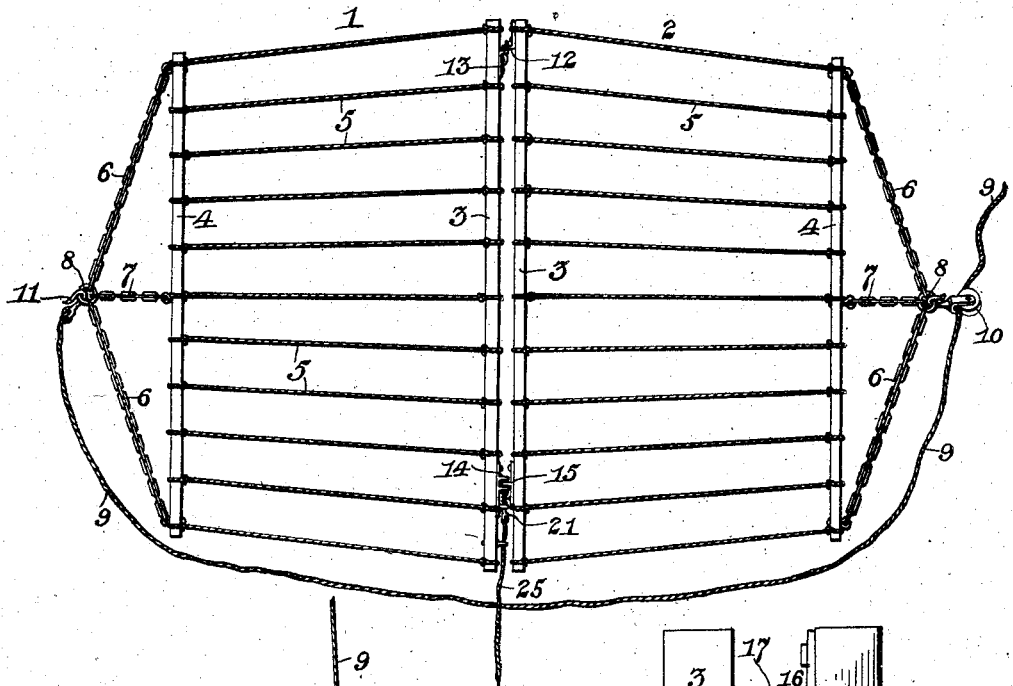
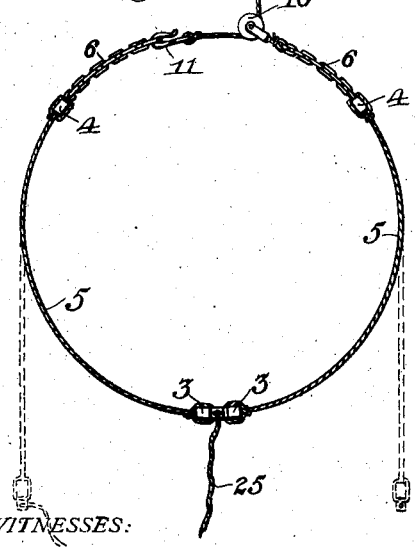
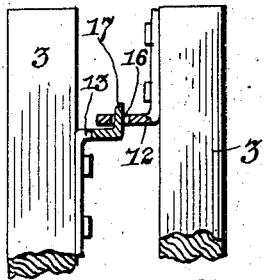
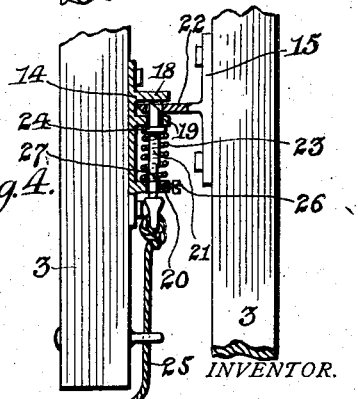
WITNESSES:
John F. Ellison
Louis Winter
INVENTOR.
Frank W. Simpson
BY
Schuyler Duryee
ATTORNEY.

UNITED STATES PATENT OFFICE.

FRANK W. SIMPSON, OF WELLINGTON, NEVADA.

HAY SLING OR NET.

No. 835,038.　　　Specification of Letters Patent.　　　Patented Nov. 6, 1906.

Application filed May 10, 1906. Serial No. 316,144.

*To all whom it may concern:*

Be it known that I, FRANK W. SIMPSON, a citizen of the United States, residing at Wellington, in the county of Lyon and State of Nevada, have invented new and useful Improvements in Hay Slings or Nets, of which the following is a specification.

The present invention relates to improvements in hay slings or nets, and is designed to be placed upon the ground or other supporting-surface to receive deposits of hay or other materials, after which the sling or net can be drawn together around the hay or other material, hoisted, and carried to any suitable point for storing or stacking the hay or other material.

With these and other objects in view the invention comprises certain novel constructions, combinations, and arrangements of parts, as will hereinafter be fully described and claimed.

In the accompanying drawings, Figure 1 is a top plan view of the improved hay sling or net, the same being unfolded and stretched out in position upon the ground ready to receive a load. Fig. 2 is an end elevation of the hay sling or net, it being shown with its ends drawn together as if about a load of hay or other material. Figs. 3 and 4 are enlarged detail views, partially in elevation and partially in section, illustrating the mechanism employed in holding the sections of the sling or net detachably together.

The hay sling or net forming the subject-matter of the present invention is so constructed that it may be stretched out upon the ground, its sections being made for the most part of flexible material, and hay, grain, or other materials may then be loaded or deposited upon the same, after which a hoisting-rope connected with the opposite ends of the net or sling may be pulled up for drawing the sling or net around the hay or other materials and elevating the whole for carrying the load to any point where it is to be deposited. The sling or net is made of separable sections which are disconnected and permitted to fall apart when the load is to be discharged from the sling or net.

In the accompanying drawing, I have illustrated one practical embodiment of the invention and will now proceed to describe the same, reference being had to said drawings.

The sling is generally formed of two sections 1 and 2, and each of said sections is provided with an inner bar 3 and an outer bar 4, connected at suitable intervals with a series of flexible cords, cables, chains, or wires, as found most desirable. The cords 5, as shown in Fig. 1 of the drawings, are preferably spread somewhat more at their inner ends than at their outer ends, and for this reason the inner bars 3 are usually made a little longer than the outer bars 4. Draft or supporting means are applied to the outer bars 4 and usually consist of cords or chains 6, connected with the end portions of said bars, and intermediate cords or chains 7 are applied to the central portions of said bars. The adjacent ends of chains 6 and 7 are connected by a ring 8 at each end of the device, and to these rings the fall or hoisting rope of any suitable elevating mechanism is applied when the sling or net is to be closed about a load and carried to another place. The said fall-rope, as 9, is generally passed through a single swivel-block or pulley 10, which is connected with one of the rings 8, as shown in Figs. 1 and 2 of the drawings, while a hook 11, carried by the end of said fall-rope, is carried around the load and secured in the other ring 8.

In order to properly hold the sling or net sections together and yet permit of their being easily and quickly separated when a load is to be discharged, suitable hinge and latch connections are interposed between the inner bars 3. These connections comprise brackets 12 and 13, bolted or otherwise secured to the said bars 3 near their ends upon one side of the sling or net, and a keeper or latch member 14 and a hasp or tongue member 15, secured to the other ends of said bars 3. The parts of these connections are clearly shown on an enlarged scale in Figs. 3 and 4 of the drawings. The bracket 12 is provided with an aperture or eye 16, while the bracket 13, arranged opposite thereto, is formed with a laterally-projecting pin or pintle 17, adapted to fit loosely into said aperture 16. Such a connection will quickly disengage if the other ends of the stiffener-bars are permitted to freely swing apart or if these bars are moved longitudinally of each other, but will not disengage otherwise. At the other end of bars 3 the keeper or latch member 14 is provided with outwardly-extending lugs 18, 19, and 20, the lugs 19 and 20 being apertured to provide bearings for a reciprocating bolt or latch 21. The lugs 18 and 19 are placed quite close together, and are adapted to receive between them the apertured tongue or projection 22 of the eye or tongue member 15. The end of the latch 21 adjacent to the lug 18 is beveled, as shown in Fig. 4, and the end of the tongue 22 is correspondingly beveled, as also shown in said figure, so that the eye or tongue 22 can be readily forced past the end of latch 21 when the said tongue is inserted between the lugs 18 and 19. The latch 21 is normally held in position to engage and lock the tongue 22 in place by means of a spring 23, which is interposed between the lug 20 and a shoulder or collar 24, secured to the said latch. One end of the latch 21 projects beyond the lug 20 and is connected with a trip-rope 25, by which the latch may be withdrawn against the action of the spring 23 when it is desired to disconnect and separate the parts. A set-screw 26 is usually provided upon the lug 20 and is adapted at its inner end to engage a flattened portion 27 of the latch 21 sufficiently to prevent the twisting or revolving of the latch in its bearings. The beveled end of the latch is thus always properly presented to the beveled end of the eye or tongue 22.

In using the device the sections 1 and 2 are brought together, the pintle 17 being first inserted in the aperture 16, after which the eye or tongue 22 is forced into place past the end of the latch 21, the said latch then springing into the aperture in the said tongue 22. The sections will thus be locked together. The sling or net is then spread upon the ground or a floor or other support and the hay, grain, or other materials can be piled upon the device. As soon as a sufficient load is accumulated the end of the fall-rope 9 is carried over the said load from the pulley 10 and the hook 11 caused to engage the ring 8. By pulling upon the fall-rope the ends of the sling or net will first be drawn upwardly around the load, as indicated in Fig. 2, and a continued pulling upon said rope will operate to lift the sling or net with its load and it may then be carried to the place for stacking the material or into a barn or other storage-place or to any point where it may be desired to discharge the contents of the sling or net. When the sling or net has been brought over the point of discharge, the trip-rope 25 is pulled sufficiently to withdraw the latch 21 and permit the tongue or eye member 15 to escape from the keeper member 14, when the sections will immediately fall apart allowing the load to drop from the sling or net.

In operating my device the catch at one end of the stiffening members 3 3, consisting of the eye 12 and the pin or pintle 13, are connected by a relative longitudinal movement of the stiffening members 3 3, and then the other members are swung together upon these as a pivot and secured by the spring-catch. In doing this the hinge connection first made serves as a stop or spacing-guide to insure the proper engagement of the spring-catch. This and the beveling of the latch-bolt 21 and the eye or tongue 22 contributes to ease, certainty, and rapidity in securing the two parts together. The stop-bracket 18 engaging the side face of the tongue or eye 22 prevents such relative longitudinal movement of the stiffener-bars 3 3 as will permit disengagement of the eye and pintle connection at the other end until after the spring-catch has been released by withdrawal of the latch-bolt 21.

It will be apparent, of course, that such a sling or net may be used with any kind of a hoisting mechanism or elevating and carrying means.

The parts of the device are exceedingly simple and yet are very effective for the purposes desired.

The sling or net being largely of flexible material can be rolled into a small compass and can thus be easily transported from place to place.

Although the sling or net is preferably made as shown and described, all minor changes in the details of construction accomplishing the same results are considered as fully within the spirit and scope of the invention.

Having now described my invention, I claim as new and desire to secure by Letters Patent—

1. A hay sling or net comprising two separable parts provided with stiffening members on their line of union, a catch joining said stiffening members at one end and releasable by relative longitudinal movement between the two members, and a catch at the other end of said members provided with means for its manual release.

2. A hay-sling comprising two separable parts provided with stiffening-bars on their line of union, an eye-and-pin connection between one end of said bars engaging and disengaging by relative longitudinal movement of the bars, an automatic catch for the other ends of said bars engageable by pressing the bars together, and means for manually releasing said automatic catch from a distance.

3. A hay-sling comprising two separable parts provided with stiffening-bars on their line of union, a disengageable hinge connection for one end of said bars, a spring-catch for the other end of said bars, and means for manually releasing said spring-catch from a distance.

4. A hay-sling comprising two separable parts provided with stiffening-bars on their line of union, a hinge connection for one end of said bars, and a catch for the other end of said bars comprising a spring-held bolt carried by one bar and an eye member carried by the other bar.

5. A hay-sling comprising two separable net-like members provided with stiffener-bars, a hinge connection for one end of said bars adapted to engage and disengage by relative longitudinal movement between said bars, a spring-catch for the other end of said bars engageable by swinging the bars together, and means for preventing relative longitudinal movement of said bars while said spring-catch is engaged.

6. A hay-sling comprising two net-like members provided with stiffener-bars on an edge, a hinge connection for one end of said stiffener-bars adapted to be engaged and disengaged by relative longitudinal movement of said bars, a spring-held latch-bolt mounted upon the other end of one of the stiffener-bars to reciprocate longitudinally thereof, an eye mounted on the other bar in position to coact with said bolt to hold the two bars together, and a stop carried by the first-named bar and engaging the said eye to prevent relative longitudinal movement between said bars of a character to release their connecting means, and means for withdrawing said latch-bar when desired.

7. A hay-sling of two parts, each part comprising two stiffener-bars connected by a series of flexible members, and a set of suspending members connected with one of said bars and joined at a common point, a rope-guide secured to said common point of one set, a closing-rope adapted to pass through said guide and to be secured to the said common point of the other set, and hinge connections for the other stiffener-bars comprising a pin-and-eye connection at each end, one of said pins being spring-held, and means for retracting said spring-held pin when desired.

8. A hay-sling of two parts each part comprising two stiffener-bars connected by a series of flexible members, and a set of suspending members connected with one of said bars and joined at a common point, a closing-rope connected with one of said common points and having a running connection with the other, a pin-and-eye hinge connection for one end of the other stiffener-bars, engageable and disengageable by relative longitudinal movement between the bars, a spring bolt-and-eye hinge connection for the other end of the same bars and a stop engaging a member of said hinge to prevent relative longitudinal movement.

FRANK W. SIMPSON.

Witnesses:
E. A. COLEMAN,
L. B. AMES.